Sept. 5, 1967  W. SCHMIDT  3,339,321
TRAILER APPARATUS

Filed May 3, 1965  3 Sheets-Sheet 1

INVENTOR
WILLIAM SCHMIDT
BY
Featherstonhaugh & Co.
ATTORNEYS

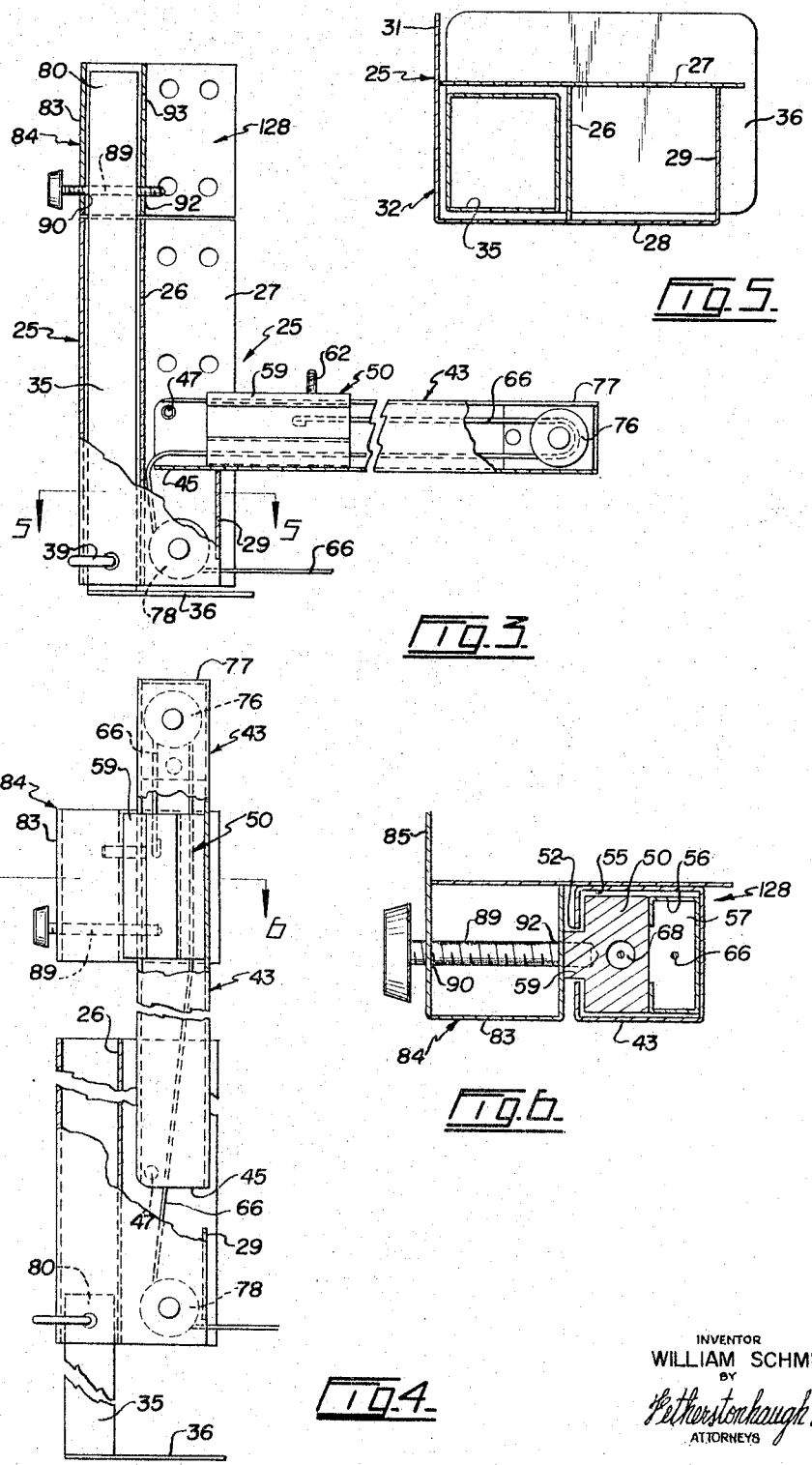

United States Patent Office 3,339,321
Patented Sept. 5, 1967

3,339,321
TRAILER APPARATUS
William Schmidt, 1312 3rd St. NE., Calgary, Alberta, Canada
Filed May 3, 1965, Ser. No. 452,600
7 Claims. (Cl. 52—66)

This invention relates to trailer apparatus, and particularly to camper trailers that are towed in collapsed condition and raised for occupancy.

An object of the present invention is the provision of camper trailer apparatus which may be applied to different types of trailers which have a base and a roof adapted to be moved between a collapsed position over and closing the base and an extended or upper position spaced above said base.

Another object is the provision of camper trailer apparatus including a base, a roof adapted to close the base and to be moved to an upper position, and operating means for raising and lowering the roof.

There are collapsible camper trailers in existence having corner posts or poles which are carried in the base of the trailer when the latter is being towed. When it is desired to raise the roof, these posts have to be inserted into sockets mounted on the base, and cables have to be threaded over and around pulleys. Furthermore, there is only one cable at each end of the trailer, and yet each cable is attempting to move the roof upwardly along two posts. This results in a binding action, and the raising of the roof is time-consuming and bothersome.

The apparatus of the present invention incorporated in a trailer includes a plurality of supporting arms swingably mounted on the base and movable between lower positions beside the base and upright positions. Each arm has a slide with means adapted releasably to connect the slide to the roof. Hoisting means is provided having cables connected to the slides and adapted simultaneously to move said slides upwardly to raise the roof while maintaining it in a horizontal position. The supporting arms are preferably arranged in opposed pairs, and the hoisting means is such that all the slides are moved upwardly at exactly the same speed by a single manually operable means, such as a crank.

Figure 1:
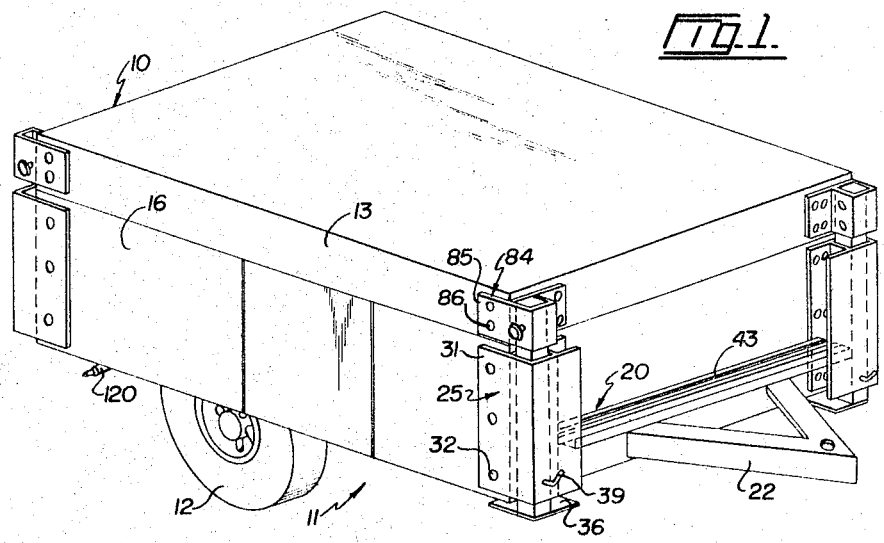
Figure 2:
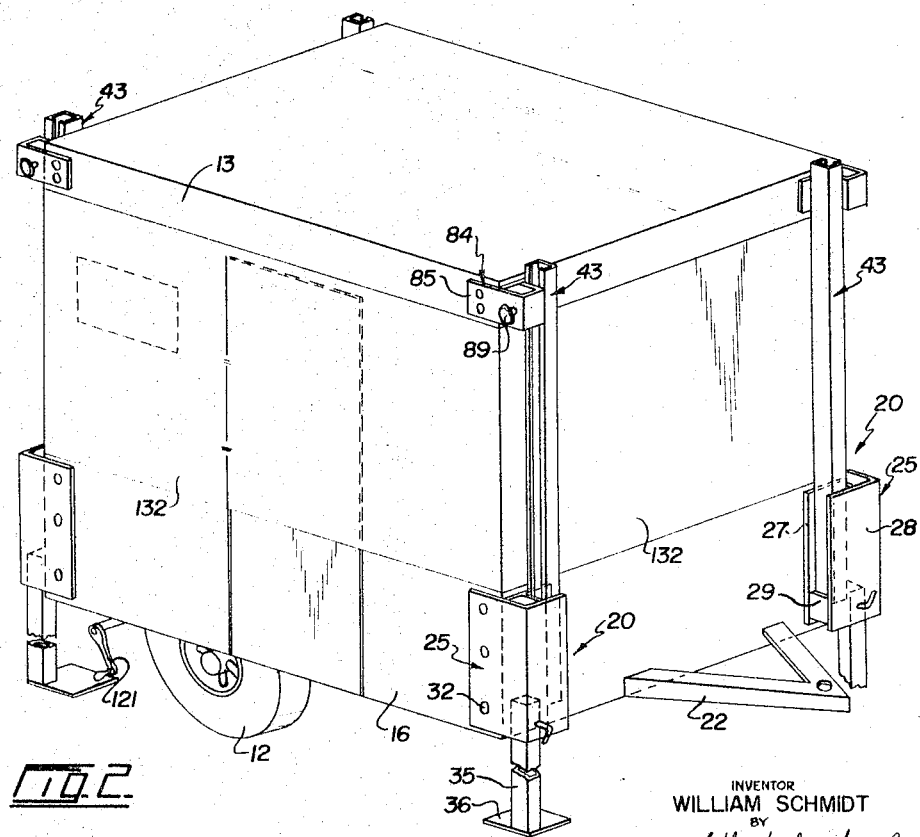
Figure 7:
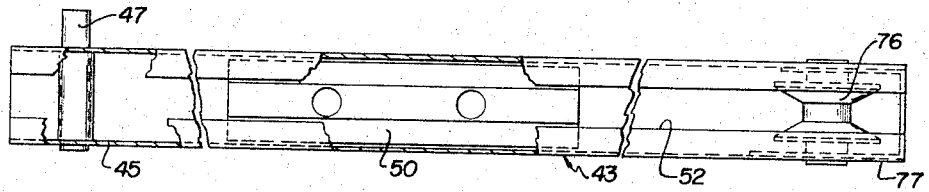
Figure 8:
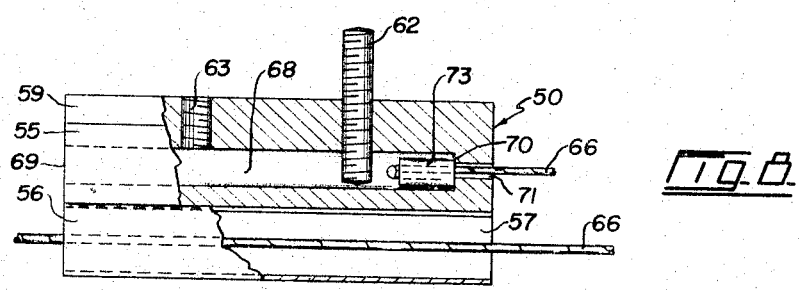
Figure 9:
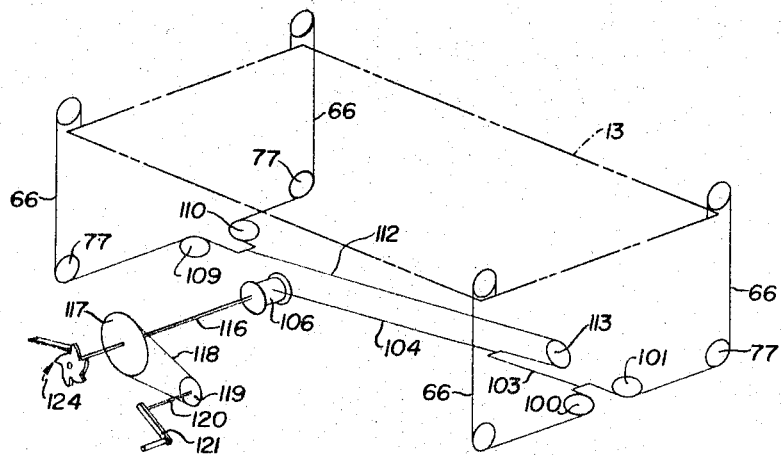

A preferred form of this invention is illustrated in the accompanying drawings, in which, FIGURE 1 is a perspective view of the camper trailer in collapsed position, FIGURE 2 is a perspective view of the trailer with the roof raised, FIGURE 3 is an enlarged sectional view of a supporting arm and its associated elements with the arm in its lower position, FIGURE 4 is a view similar to FIGURE 3 with the supporting arm in the upright position, FIGURE 5 is an enlarged section taken on the line 5—5 of FIGURE 3, FIGURE 6 is an enlarged section taken on the line 6—6 of FIGURE 4, FIGURE 7 is an elevation of one of the supporting arms, FIGURE 8 is an enlarged vertical section through one of the slides, and FIGURE 9 diagrammatically illustrates the hoisting cable set-up.

Referring to the drawings, 10 is a camper trailer having a base 11 mounted in any desired manner on suitable running gear 12, and a roof 13. Base 11 has an upstanding peripheral wall 16. A plurality of raising mechanisms are provided on base 11, and there is preferably one of these at each corner of the trailer. A drawbar 22 is secured to and projects outwardly from one end of body 11.

As the four illustrated raising mechanisms 20 are identical, only one needs to be described in detail herein.

Raising mechanism 20 comprises a main bracket 25 which is preferably of U-shape in cross section, see FIGURE 5, and has a vertical back 26 and arms or sides 27 and 28 connected to and projecting outwardly from said back. A support 29 extends between sides 27 and 28 at the lower ends thereof, said support being spaced from back 26, see FIGURE 3. An elongated socket 30 is mounted on bracket 25 along back 26. Bracket 25 is mounted on base 11 at a corner thereof, and for this purpose, the bracket is provided with a flange 31 adapted to extend along a side wall of the body when the bracket extends along an end wall thereof. Flange 31 is secured to base wall 16 in any suitable manner, such as by bolts or rivets 32. A leg 35 having a foot 36 at its lower end is slidably mounted in socket 30 and is normally held in said socket, when the trailer is in collapsed condition in any suitable manner, such as by means of a clamping screw 39 threaded through the wall of socket 30 near the lower end thereof, said clamping screw being adapted to be turned with its inner end pressing against the leg to help hold it in the socket.

A supporting arm 43 is swingably mounted on bracket 25 adjacent a lower end 45 of the arm. In this example, the lower end 45 of the supporting arm extends into bracket 25 between the sides 27 and 28 thereof, and is pivotally connected to these sides by means of a pin 47 which extends through said bracket sides and the supporting arm, see FIGURES 3 and 4. When the trailer is collapsed, arm 43 is retained in a substantially horizontal position extending along the side wall of trailer base 11, at which time, the lower portion or end 45 of the arm rests on support 29 of the bracket, see FIGURE 3. When it is desired to raise roof 13, arm 43 is swung into an upright position, as shown in FIGURE 4. At this time, the lower portion of the arm is retained between bracket sides 27 and 28, and back 26 prevents said arm from swinging beyond its upright position when it is moved upwardly from the horizontal position.

A slide 50 is provided for supporting arm 43 and is movable longitudinally thereof. Although this slide may be mounted on the outside of the arm, it is preferable to make arm 43 of hollow construction and to mount slide 50 therein. In this case, a slot 52 is formed in a wall of arm 43 and extends longitudinally thereof. Slide 50 is formed with a body 55 having a U-shaped bracket 56 extending along one edge thereof, said bracket forming a relatively large pasage 57 extending vertically through the slide, see FIGURES 6 and 8. Body 55 and bracket 56 are of the same shape and size in cross section as the interior of arm 43 so that slide 50 slidably fits within said arm. Arm slot 52 is relatively wide, and body 55 is formed with an elongated tongue 59 extending longitudinally thereof which slidably fits in slot 52. A pin 62 is threaded into tongue 59 and body 55, and projects outwardly from said tongue. A tapped hole 63 is formed in the tongue below pin 62.

A cable 66 is connected to slide 50 in any convenient manner. In this example, body 55 is formed with a bore 68 extending longitudinally thereof, said bore opening outwardly from the bottom of the slide at 69, and being closed at its upper end by a wall 70 having a small hole 71 therein. Cable 66 extends through hole 71 in the upper end of slide body 55 and has a ferrule 73 clamped to its inner end, said ferrule being located within bore 68. Pin 62 is withdrawn when cable 66 is threaded through hole 71, and after ferrule 73 is moved to the upper end of bore 68, pin 62 is replaced and extends across said bore so that ferrule 73 cannot move downwardly beyond the pin when cable 66 is relaxed.

A suitable bearing, such as a pulley 76, is rotatably mounted in arm 43 adjacent its upper end 77. Cable 66 extends from slide 50 along arm 43 and around pulley 76, whence it extends back along the arm through passage 57 of the slide bracket 56, and out of the lower end 45 of the arm. In this example, cable 66 extends around another bearing, such as a pulley 78, mounted in bracket 25 adjacent the lower end of the latter, see FIGURES 3 and 4.

As previously stated, when the trailer is in its collapsed position, leg 35 is retained in socket 30 by screws 39. When it is desired to stabilize base 13 of the trailer, screw 39 is loosened to let leg 35 drop downwardly until foot 36 engages the ground, at which time, said clamping screw is tightened to retain the leg in this position.

It will be noted that when leg 35 is in its upper position within socket 30, the upper end 80 of the leg projects upwardly beyond the top of bracket 25. When roof 13 is in its lower position lying over and covering base 11, the upper end 80 of leg 35 projects into a socket 83 of a roof bracket 84 mounted on roof 13 immediately above main bracket 25. Socket 83 is immediately above and is of the same cross sectional shape as socket 30. Bracket 84 is formed with a flange 85 which fits around the corner of roof 13 and is secured to the latter by means of bolts or rivets 86. A screw 89 is threaded through a wall of socket 83 and extends into a hole 90 formed in the upper end of leg 35. Screw 89 helps to retain leg 35 in its socket 30, and it secures roof 13 in its collapsed position. When leg 35 has been dropped downwardly, screw 89 can be turned through another hole 92 in a wall of socket 83 opposite hole 90, and into tapped hole 63 of slide 50 when arm 43 has been moved to its upright position. At this time, pin 62 projecting outwardly from the slide fits into a third hole 93 formed in the wall of sockets 83 above hole 92, see FIGURE 4.

When it is desired to raise roof 13, leg 35 is dropped until foot 36 engages the ground and clamping screw 39 is tightened. Then arm 43 is swung upwardly into its upright position. As it approaches the upright position, pin 62 of slide 50 enters hole 93 of roof socket 84 to position the slide properly relative to the roof. Then screw 89 is turned inwardly through hole 92 and into hole 63 of the slide. This firmly secures the slide to bracket 83 and, consequently, to roof 13. When the inner end of cable 66 is pulled downwardly relative to arm 43, slide 50 moves upwardly taking roof 13 with it. When the cable is released, the weight of the roof moves slide 50 downwardly along arm 43.

As previously stated, there preferably is a raising mechanism 20 at each of the four corners of trailer base 11 and roof 13. In the illustrated example of the invention, there is a pair of raising mechanisms 20 at each end of trailer 10 and the supporting arms 43 thereof extend across the adjacent end of base 11. However, it will be understood that the raising mechanism and their arms may be arranged in opposed pairs at the opposite sides of the base and roof, in which case the arms of each pair would extend along the sides thereof.

It is desirable simultaneously to move slides 50 upwardly along their respective arms. For this purpose, cables 66 at one end of the trailer, see FIGURE 9, extend around their respective pulleys 77 and inwardly of the trailer. These cables extend around pulleys 100 and 101 mounted on the bottom of base 11 and are connected to a connector cable 103. This cable in turn is connected to an end of a main cable 104 which extends longitudinally of base 11 and is wound on a drum 106 mounted on the bottom of said base in any convenient manner. The cables 66 at the opposite end of the trailer extend inwardly from their respectively pulleys 77 and around pulleys 109 and 110 mounted on base 11. These cables are connected to another connector cable 112, the opposite end of which extends around a pulley 113 mounted adjacent pulleys 100 and 101 on base 11, and is connected to the end of main cable 104 which is connected to connector cable 103.

Cable drum 106 is mounted on a shaft 116 which extends laterally towards the side of base 11 and has a relatively large sprocket 117 mounted thereon, said sprocket being connected by a chain 118 to a smaller sprocket 119 mounted on a shaft 120 rotatably supported beneath base 11 in any convenient manner. Shaft 120 projects beyond the side of base 11, and a crank 121 is connected to the outer end of this shaft. A ratchet and pawl arrangement 124 is mounted on shaft 116 adjacent sprocket 117. If desired, instead of crank 121, a small electric motor, preferably battery operated, can be mounted on the bottom of base 11 and be operatively connected to shaft 120.

As all of the cables 66 of the raising mechanisms 20 are connected to the common main cable 104, all of said cables 66 are moved at the same speed when cable 104 is wound on drum 106 by turning crank 121 or by an electric motor, if the latter is supplied. When cable 104 is wound on the drum, cables 66 are moved to shift slides 50 upwardly of upright arms 43. This lifts roof 13 at the four corners thereof while maintaining said roof in a horizontal plane. Ratchet arrangement 124 prevents the roof from moving downwardly at this time.

When it is desired to lower roof 13, it is only necessary to release the ratchet arrangement 24 and to hold crank 21 so that it does not turn too fast. The weight of the roof shifts it and slides 50 downwardly along supporting arms 43.

As arms 43 are arranged in opposed pairs, they cannot, when in their upright positions, swing outwardly of the trailer since each arm will abut the back 26 of its bracket 25 so that it cannot swing outwardly beyond its upright position. As the arms are secured to the roof through their respective slides 50, neither arm can swing inwardly at this time. It will be noted that sides of sockets 83 of roof brackets 84 project outwardly to form notches 128 in said brackets in which the adjacent supporting arms 43 fit, see FIGURE 6. Thus, the connection of the roof brackets to slides 50 and the fitting of arms 43 in notches 128 keep the roof steady as it moves upwardly or downwardly.

Suitable flexible walls 132 are provided between roof 13 and base 11. These walls may be formed of waterproofed canvas or other suitable fabric or plastic material, and they are connected at upper edges to roof 13 and at lower edges to the peripheral wall 16 of base 11. These walls may be permanently or removably connected to the roof and base, and they may have suitable windows, doors and other ventilating openings therein. If the supporting arms extend across the ends of the trailer when in the collapsed position, a door can be provided in wall 16 at a side of the trailer. On the other hand, if the supporting arms extend along the sides of the trailer, a door can be provided in an end wall of said trailer.

If desired, collapsible solid walls made up of hinged sections can be substituted for flexible walls 132.

When trailer 10 is moved into a position where it is to be used for camping purposes, screws 89 are removed from the four mechanisms 20 at the corners of the trailer and leg 35 is dropped as described above. The arms 43 at each end of the trailer are swung upwardly into their upright positions, during which time pins 62 of the slides 50 of the arms fit into holes 93 of the adjacent roof brackets 84. Screws 89 may be turned until they connect the roof brackets to slides 50, at which time, walls of sockets 83 bear against the outer surface of tongues 59 of the slides. Then handle 121 is turned to raise the roof to the full height permitted by walls 132. Ratchet arrangement 124 retains the roof in this extended or elevated position. The trailer is now ready for use.

In order to fold up the trailer, ratchet arrangement 124 is released and roof 13 allowed to move downwardly until brackets 84 rest on main brackets 25, at which time, the roof covers and closes base 11. Screws 89 are turned outwardly to clear slides 50, and then arms 43 can be swung inwardly to their lower or horizontal positions. If desired, covers, not shown, may be provided on base 11 for these arms when they are in their lower positions. Clamping screws 39 are released and legs 35 moved upwardly to their upper positions. Clamping screws 39 can then be tightened to hold the legs in position, and screws 89 are turned in to fit into holders 90 at the upper ends of these legs to ensure that the legs remain in their upper position and to lock roof 13 in its lower position over legs 11.

Although this apparatus is particularly designed for camping purposes, it is obvious that it can be used as a trailer for any desired purpose.

What I claim as my invention is:

1. Trailer apparatus comprising a base, a roof adapted to be moved between a collapsed position over and closing the base and an extended position spaced above said base, a plurality of hollow supporting arms each swingably mounted adjacent a lower end thereof on the base at an edge of said base and swingable between a lower position extending along the base and an upright position beside the roof, each arm having a slot therein extending longitudinally thereof, a slide mounted in each arm for movement longitudinally thereof, securing means on each slide and projecting through the slot of the arm of said each slide adapted releasably to be connected to the roof when the latter arm is in the upright position, and lifting means connected to said slides for moving the latter along the upright arms to raise the roof to said extended position.

2. Trailer apparatus comprising a base, a roof adapted to be moved between a collapsed position over and closing the base and an extended position spaced above said base, a plurality of hollow supporting arms each swingably mounted adjacent a lower end thereof on the base at an edge of said base and swingable between a lower position extending along the base and an upright position beside the roof, each arm having a slot therein extending longitudinally thereof, a slide mounted in each arm for movement longitudinally thereof, securing means on each slide and projecting through the slot of the arm of said each slide adapted releasably to be connected to the roof when the latter arm is in the upright position, bearing means mounted in each arm adjacent the upper end thereof, a cable in each arm connected to the slide thereof and extending over said bearing means of said each arm and back towards the lower end of the latter arm and out of the latter, and hoisting means connected to the cables of all the arms and operable to pull said cables over the bearing means of their respective arms to move the slides towards the upper ends of the arms when said arms are in the upright positions.

3. Trailer apparatus comprising a base, a roof adapted to be moved between a tcollapsed position over and closing the base and an extended position spaced above said base, a plurality of pairs of hollow supporting arms swingably mounted adjacent a lower end thereof on the base at an edge of said base, said ends of each pair of arms beting spaced from each other and the arms of each pair being swingable towards each other into lower positions extending along the base and away from each other into upright positions beside the roof, stop means on the base engageable by the arms when said arms are moved away from each other to prevent the arms from moving past the upright positions thereof, each arm having a slot therein extending longitudinally thereof, a slide mounted in each arm for movement longitudinally thereof, securing means on each slide and projecting through the slot of the arm of said each slide adapted releasably to be connected to the roof when the latter arm is in the upright position, and lifting means connected to said slides for moving the latter along the upright arms to raise the roof to said extended position.

4. Trailer apparatus comprising a base, a roof adapted to be moved between a collapsed position over and closing the base and an extended position spaced above said base, a plurality of lifting mechanisms mounted on the base and adapted to be connected to the roof for raising the latter, each lifting mechanism comprising a hollow supporting arm hingedly mounted adjacent a lower end thereof on the base, said arm having a slot therein extending longitudinally thereof, a slide mounted in the arm for movement longitudinally thereof, securing means on the slide and extending through the arm slot adapted releasably to be connected to the roof when the arm is in the upright position thereof, bearing means in the arm adjacent an outer end thereof, a cable in the arm connected to the slide and extending over said bearing means and back towards the lower end of the arm and out of the latter; and hoisting means connected to the cables of all the lifting mechanisms and operable to pull said cables over the bearing means of their respective arms to move the slides towards the upper ends of the arms when said arms are in the upright positions.

5. Apparatus for trailers having a base and a roof movable from a collapsed position covering the base to an extended position above said base, comprising a hollow supporting arm, hinge means adjacent one end of the arm adapted to be connected to the base, a slot formed in the arm extending longitudinally thereof, a slide mounted in the arm for movement longitudinally of the arm, bearing means in the arm adjacent an opposite end thereof, securing means on the slide and projecting through the arm slot and adapted to be connected to the roof, and a cable in the arm connected to the slide and extending over said bearing means and back to and through said one end of the arm.

6. Apparatus for trailers having a base and a roof movable from a collapsed position covering the base to an extended position above said base, comprising a main bracket adapted to be mounted on said base, a hollow supporting arm hingedly mounted near one end thereof on the bracket, a slide mounted in the arm for movement longitudinally thereof, a slot in and extending longitudinally of the arm, a roof bracket adapted to be mounted on said roof and having a socket therein, a pin mounted on the slide and projecting through the arm slot adapted to fit in the roof bracket slot, bearing means in the arm adjacent an opposite end thereof, and cable means in the arm connected to the slide and extending over the bearing means and back towards said one end of the arm and out of the latter.

7. Apparatus for trailers having a base and a roof movable from a collapsed position covering the base to an extended position above said base, comprising a main bracket of U-shape cross section adapted to be mounted on said base, said bracket having a back and spaced arms forming the U section thereof, a socket mounted on said back outside said arms, a leg slidably mounted in the socket and movable into a position extending outwardly from the socket, fastening means at the socket for selectively retaining the leg therein and in the outwardly extending position thereof, a hollow supporting arm hingedly mounted near one end thereof on the bracket between said arms, a slide mounted in the arm for movement longitudinally thereof, a slot in and extending longitudinally of the arm, securing means on the slide and projecting through the arm slot adapted to be connected to said base, bearing means in the arm adjacent an opposite end thereof, and cable means in the arm connected to the slide and extending over the bearing means and back towards said one end of the arm and out of the latter.

References Cited

UNITED STATES PATENTS

| | | | | |
|---|---|---|---|---|
| 1,937,900 | 12/1933 | Levy | | 296—23 |
| 1,946,164 | 2/1934 | Houdashelt | | 296—23 |
| 2,003,581 | 6/1935 | Daly | | 52—118 |
| 2,834,632 | 5/1958 | Mattox | | 296—27 |

LEO FRIAGLIA, *Primary Examiner.*

BENJAMIN HERSH, *Examiner.*

P. GOODMAN, *Assistant Examiner.*